US012789842B2

(12) United States Patent
Alhammadi et al.

(10) Patent No.: US 12,789,842 B2
(45) Date of Patent: Nov. 10, 2026

(54) ENHANCED SELF-LOCALIZATION FOR DRONES USING RECONFIGURABLE INTELLIGENT SURFACES AND FUSION ALGORITHM INTEGRATION

(71) Applicant: Technology Innovation Institute—Sole Proprietorship LLC, Masdar City (AE)

(72) Inventors: Ahmed Ali Ahmed Alqayed Alhammadi, Shakhbout City (AE); Jiguang He, Abu Dhabi (AE)

(73) Assignee: Technology Innovation Institute—Sole Proprietorship LLC, Masdar City (AE)

( * ) Notice: Subject to any disclaimer, the term of this patent is extended or adjusted under 35 U.S.C. 154(b) by 2 days.

(21) Appl. No.: 18/960,589

(22) Filed: Nov. 26, 2024

(65) Prior Publication Data

US 2025/0178637 A1 Jun. 5, 2025

Related U.S. Application Data

(60) Provisional application No. 63/605,026, filed on Dec. 1, 2023.

(51) Int. Cl.
*B60W 60/00* (2020.01)
*G01S 13/46* (2006.01)

(52) U.S. Cl.
CPC ........... *B60W 60/001* (2020.02); *G01S 13/46* (2013.01); *B60W 2556/50* (2020.02); *G01S 2013/466* (2013.01)

(58) Field of Classification Search
CPC .... B60W 60/001; G01S 13/46; G01S 13/876; G06T 7/277; B64C 39/024
See application file for complete search history.

(56) References Cited

U.S. PATENT DOCUMENTS 12,082,179 B2 9/2024 Dai et al.
2022/0321198 A1* 10/2022 Devoti .............. H04B 7/04013
(Continued)

FOREIGN PATENT DOCUMENTS

CN 115842699 3/2023
CN 116781143 9/2023
(Continued)

OTHER PUBLICATIONS

International Search Report and Written Opinion for Application No. PCT/IB2024/061885, mailed on Jan. 28, 2025, 13 pages.
(Continued)

*Primary Examiner* — Toya Pettiegrew
(74) *Attorney, Agent, or Firm* — DLA Piper LLP (US)

(57) ABSTRACT

A controller for controlling an autonomous vehicle. The controller comprises a reconfigurable intelligent surface (RIS) transceiver configured to receive RIS signals from a RIS device, a positioning signal receiver configured to receive positioning signals from a positioning signal transmitter, and a processor. The processor is configured to process the RIS signals to produce RIS data, process the positioning signals to produce positioning data, fuse the RIS data and the positioning data using a data fusion algorithm to compute a location of the autonomous vehicle, and control operation of the autonomous vehicle based on the computed location.

20 Claims, 8 Drawing Sheets

(56) References Cited

U.S. PATENT DOCUMENTS

| | | | | |
|---|---|---|---|---|
| 2022/0322321 | A1 | 10/2022 | Dai et al. | |
| 2023/0063285 | A1* | 3/2023 | Horn | H04B 7/18504 |
| 2025/0096849 | A1* | 3/2025 | Bhattacherjee | H04W 56/001 |
| 2025/0142513 | A1* | 5/2025 | Shimizu | H04W 64/00 |

FOREIGN PATENT DOCUMENTS

| | | | |
|---|---|---|---|
| CN | 116865810 | A | 10/2023 |
| KR | 20230102998 | A | 7/2023 |
| WO | 2024105646 | A1 | 5/2024 |

OTHER PUBLICATIONS

Examination Report for AE Application No. P2024-03213, dated Jan. 13, 2026, 9 pages.

* cited by examiner

ENHANCED SELF-LOCALIZATION FOR DRONES USING RECONFIGURABLE INTELLIGENT SURFACES AND FUSION ALGORITHM INTEGRATION

CROSS-REFERENCE TO RELATED APPLICATIONS

This application claims priority to U.S. Provisional Application No. 63/605,026, filed Dec. 1, 2023, which is incorporated by reference in its entirety.

FIELD

A system and method for enhanced self-localization for drones using reconfigurable intelligent surfaces and fusion algorithm integration.

BACKGROUND

Drone self-localization is a process where a drone determines and monitors location in free-space relative to other objects (e.g., structures, other drones, destination location, etc.) to maneuver safely and efficiently. Current drone self-localization, however, relies solely on global positioning system (GPS) signals for position determination. The use of GPS signals is problematic due to inaccuracies that occur due to signal interference and multipath effects that may be present in urban environments.

SUMMARY

In one aspect, the present disclosure relates to a controller for controlling an autonomous vehicle. The controller comprises a reconfigurable intelligent surface (RIS) transceiver configured to receive RIS signals from a RIS device, a positioning signal receiver configured to receive positioning signals from a positioning signal transmitter, and a processor. The processor is configured to process the RIS signals to produce RIS data, process the positioning signals to produce positioning data, fuse the RIS data and the positioning data using a data fusion algorithm to compute a location of the autonomous vehicle, and control operation of the autonomous vehicle based on the computed location.

In embodiments of this aspect, the disclosed system according to any one of the above example embodiments, the RIS transceiver is further configured to receive additional RIS signals from at least one additional RIS device, and the processor is further configured to compute the location of the autonomous vehicle relative to a reference location associated with the RIS device and the at least one additional RIS device based on the RIS signals and the additional RIS signals.

In embodiments of this aspect, the disclosed system according to any one of the above example embodiments, the RIS transceiver is further configured to transmit a wake-up signal to the RIS device thereby triggering the RIS device to transmit the RIS signals to the RIS transceiver.

In embodiments of this aspect, the disclosed system according to any one of the above example embodiments, the processor is further configured to control operation of the autonomous vehicle by controlling at least one of speed, direction, acceleration, or attitude of the autonomous vehicle to navigate the autonomous vehicle to a destination relative to the RIS device.

In embodiments of this aspect, the disclosed system according to any one of the above example embodiments, the received RIS signals as passive signals transmitted from the RIS transceiver and reflected from the RIS device, or the received RIS signals as active signals transmitted from the RIS device in response to a wake-up signal transmitted from the autonomous vehicle to the RIS device.

In embodiments of this aspect, the disclosed system according to any one of the above example embodiments, the processor is further configured to compute a relative location of the autonomous vehicle to the RIS device by trilateration based on the received RIS signals.

In embodiments of this aspect, the disclosed system according to any one of the above example embodiments, the positioning signal receiver is further configured to receive the positioning signals as at least one of global positioning system (GPS) signals or cellular signals.

In embodiments of this aspect, the disclosed system according to any one of the above example embodiments, the processor is further configured to compute the location of the autonomous vehicle by computing an initial position based on the positioning signals and adjusting the initial position based on channel parameters computed from the RIS signals.

In embodiments of this aspect, the disclosed system according to any one of the above example embodiments, the processor is further configured to fuse the RIS data and the positioning data using the fusion algorithm comprising an extended Kalman filter that adjusts weights of the RIS data and the positioning data to compute the location of the autonomous vehicle.

In embodiments of this aspect, the disclosed system according to any one of the above example embodiments, the processor is further configured to weight contributions of the RIS data and the positioning data for computing the location of the autonomous vehicle based on channel parameters computed from the RIS signals and the positioning signals and based on relative location of the autonomous vehicle to the RIS device.

In one aspect, the present disclosure relates to a method for controlling an autonomous vehicle. The method comprises receiving, by a reconfigurable intelligent surface (RIS) transceiver of the autonomous vehicle, RIS signals from a RIS device, receiving, by a positioning signal receiver of the autonomous vehicle, positioning signals from a positioning signal transmitter, processing, by a processor of the autonomous vehicle, the RIS signals to produce RIS data, processing, by the processor of the autonomous vehicle, the positioning signals to produce positioning data, fusing, by the processor of the autonomous vehicle, the RIS data and the positioning data using a data fusion algorithm to compute a location of the autonomous vehicle, and controlling, by the processor of the autonomous vehicle, operation of the autonomous vehicle based on the computed location.

In embodiments of this aspect, the disclosed method according to any one of the above example embodiments further comprises receiving, by the RIS transceiver, additional RIS signals from at least one additional RIS device; and In embodiments of this aspect, the disclosed method according to any one of the above example embodiments further comprises computing, by the processor, the location of the autonomous vehicle relative to a reference location associated with the RIS device and the at least one additional RIS device based on the RIS signals and the additional RIS signals.

In embodiments of this aspect, the disclosed method according to any one of the above example embodiments further comprises transmitting, by the RIS transceiver, a wake-up signal to the RIS device thereby triggering the RIS device to transmit the RIS signals to the RIS transceiver.

In embodiments of this aspect, the disclosed method according to any one of the above example embodiments further comprises controlling, by the processor operation of the autonomous vehicle by controlling at least one of speed, direction, acceleration, or attitude of the autonomous vehicle to navigate the autonomous vehicle to a destination relative to the RIS device.

In embodiments of this aspect, the disclosed method according to any one of the above example embodiments further comprises receiving, by the RIS transceiver, the received RIS signals as passive signals transmitted from the RIS transceiver and reflected from the RIS device, or In embodiments of this aspect, the disclosed method according to any one of the above example embodiments further comprises receiving, by the RIS transceiver, the received RIS signals as active signals transmitted from the RIS device in response to a wake-up signal transmitted from the autonomous vehicle to the RIS device.

In embodiments of this aspect, the disclosed method according to any one of the above example embodiments further comprises computing, by the processor, a relative location of the autonomous vehicle to the RIS device by trilateration based on the received RIS signals.

In embodiments of this aspect, the disclosed method according to any one of the above example embodiments further comprises receiving, by the positioning signal receiver, the positioning signals as at least one of global positioning system (GPS) signals or cellular signals.

In embodiments of this aspect, the disclosed method according to any one of the above example embodiments further comprises computing, by the processor, the location of the autonomous vehicle by computing an initial position based on the positioning signals and adjusting the initial position based on channel parameters computed from the RIS signals.

In embodiments of this aspect, the disclosed method according to any one of the above example embodiments further comprises fusing, by the processor, the RIS data and the positioning data using the fusion algorithm comprising an extended Kalman filter that adjusts weights of the RIS data and the positioning data to compute the location of the autonomous vehicle.

In embodiments of this aspect, the disclosed method according to any one of the above example embodiments further comprises weighting, by the processor, contributions of the RIS data and the positioning data for computing the location of the autonomous vehicle based on channel parameters computed from the RIS signals and the positioning signals and based on relative location of the autonomous vehicle to the RIS device.

BRIEF DESCRIPTION OF THE DRAWINGS

So that the way the above-recited features of the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

DETAILED DESCRIPTION

Figure 1:
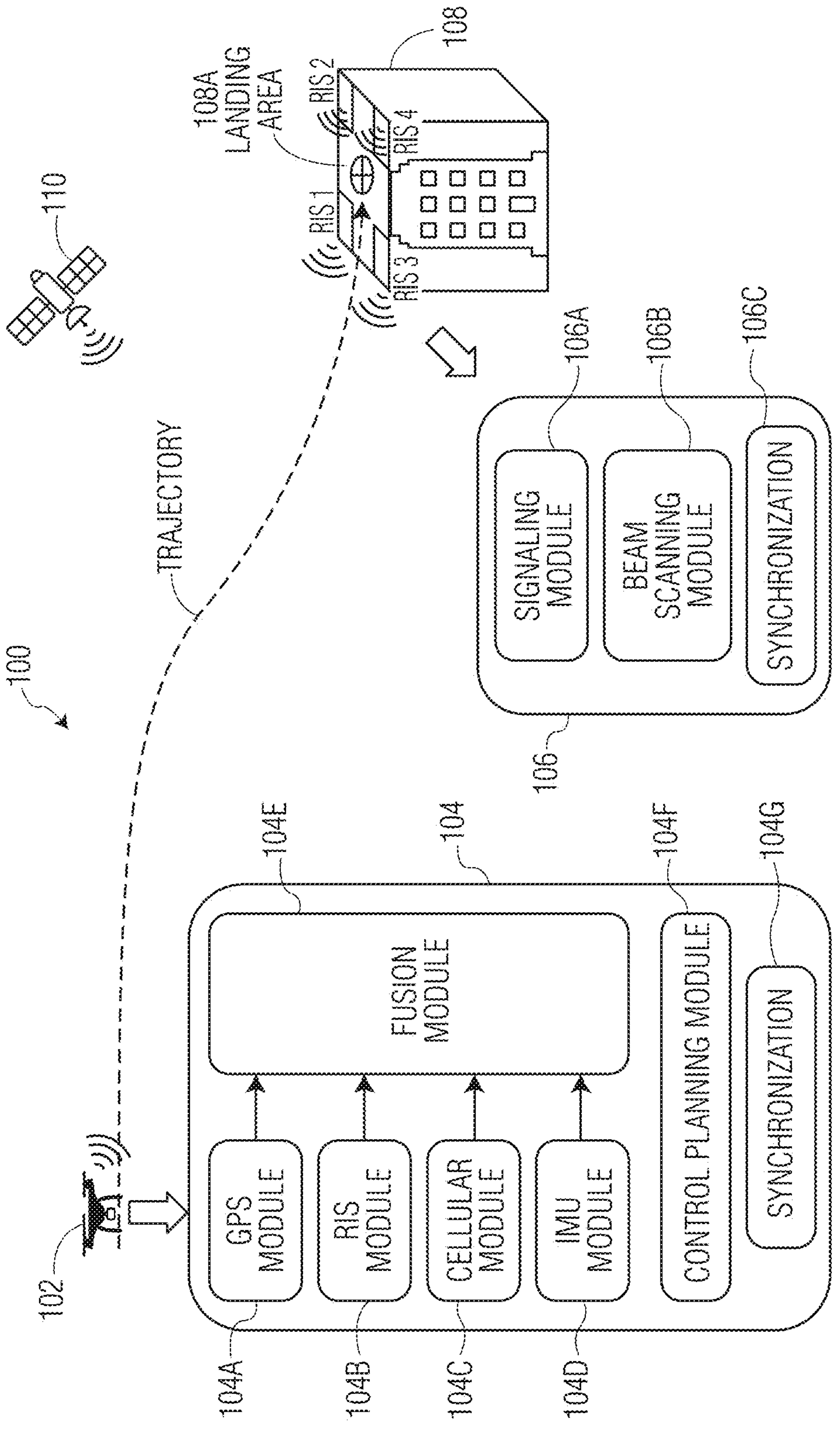
FIG. 1 shows a block diagram of an unmanned aerial vehicle (UAV) self-localization system, according to an example embodiment of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatus as known by one of ordinary skill in the relevant art may not be discussed in detail but are intended to be part of the specification where appropriate. In all the examples illustrated and discussed herein, any specific values should be interpreted to be illustrative and non-limiting. Thus, other example embodiments may have different values. Notice that similar reference numerals and letters refer to similar items in the following figures, and thus once an item is defined in one figure, it is possible that it need not be further discussed for the following figures. Below, the example embodiments will be described with reference to the accompanying figures.

In various applications, drones (e.g., UAVs) are utilized to perform certain tasks. These tasks generally require the drone to determine positioning and perform navigation. In other words, self-localization can be important to ensuring accurate autonomous positioning and navigation along a trajectory. Accurate self-localization can be particularly important in certain applications. For example, when using drones for delivery and logistics, accurate drone self-localization can be important where drones are required to navigate complex environments and deliver goods to precise locations. In another example, when using drones for geospatial data collection and surveying improved drone self-localization can enhance geospatial data collection and mapping tasks, such as aerial photography, topographic mapping, and remote sensing. In yet another example, when using drones for agriculture, accurate drone localization is important for tasks such as crop monitoring, targeted pesticide application, and irrigation management. The above use cases are of course examples, and it is noted that drones may be used in various applications where self-localization is important to drone operation and performance.

The disclosed methods, devices and systems herein overcome the limitations of the existing systems by providing a drone (e.g., unmanned aerial vehicle (UAV)) self-localization system that utilizes (i.e., fuses) multiple positioning signals including but not limited to global positioning system (GPS) positioning signals, reconfigurable intelligent surface (RIS) positioning signals, cellular positioning signals and internal measurement unit (IMU) positioning signals. In some examples, the RIS positioning signals and at least one of the other types of positioning signals are fused together using data fusion algorithms such as an extended Kalman filter which attempts to optimally weight the signals to determine an accurate position of the drone in free space. The determined position is then used to perform accurate navigation (e.g., trajectory planning, velocity/attitude control, landing assistance, etc.) for the drone. The use of RIS positioning signals is especially powerful in urban environments where GPS and cellular signals are subject to multipath effects. For example, RIS systems may be strategically positioned relative to the drone path and the drone destination (e.g., RIS antennas may be positioned along the drone path and at the drone destination). When the drone is navigating along a path, certain RIS antennas provide signals that aid the drone in navigating along the path, whereas when the drone is approaching the destination (e.g., landing pad), other RIS antennas provide signals that help guide the drone to a safe landing at the destination. Examples of this use case are described in the figures below.

The drone may be a UAV, a road vehicle or the like that is tasked with achieving a goal that is dependent upon accurate positioning and navigation. Benefits of the disclosed methods, devices and systems include but are not limited to achieving accurate drone positioning and navigation in challenging environments. For example, the RIS technology can manipulate electromagnetic waves to enhance the received signal strength, potentially improving the localization performance in environments where GPS signals may be weak, such as in urban areas or indoors. RIS technology can also help mitigate multipath effects which occur when signals bounce off surfaces causing delays and errors in localization. By actively controlling the reflection properties of the RIS, the localization system can reduce the impact of multipath effects, thereby improving the accuracy and reliability of position estimation. Furthermore, the combination of RIS and GPS signals allows for a more flexible localization system that can adapt to different environments and scenarios. This is particularly useful in situations where other localization methods may not be practical, such as when vision-based or lidar-based methods are obstructed or affected by adverse weather conditions. The integration of RIS technology into the drone localization system may potentially lower costs compared to some alternative solutions, such as RTK GPS or lidar-based systems, which can require expensive hardware or infrastructure. The proposed technique can be easily scaled and integrated into various types of drones and autopilot systems, making it a versatile solution for a wide range of applications. By utilizing the existing GPS satellite system and adding RIS technology, the proposed solution can take advantage of the global coverage and accessibility of GPS without requiring significant changes to the existing infrastructure. Overall, the proposed technique of using RIS signals in combination with GPS signals and a fusion algorithm module, such as an extended Kalman filter (EKF) module, offers a promising solution to improve drone self-localization. The advantages in terms of flexibility, resilience, cost-effectiveness, and scalability make it a compelling alternative to other competing methods in various drone applications and environments.

FIG. 1 shows a block diagram 100 of an unmanned aerial vehicle (UAV) self-localization system. The drone in this example is a UAV 102 propelled by rotating propellers for performing package delivery to a precise location on landing area 108A, which in this example, is located on the roof of building 108. UAV 102 in this example includes UAV controller 104 including GPS module 104A, RIS module 104B, cellular module 104C and IMU module 104D connected to fusion module 104E. GPS module 104A, RIS module 104B, cellular module 104C and IMU module 104D generally include circuitry and antennas for facilitating reception and/or transmission of signals from/to UAV 102. In addition, UAV 102 can also include a control/planning module 104F and synchronization module 104G. Also included in the system of FIG. 1, is a RIS system including RIS module 106 (e.g., located at the destination) and connected to RIS antennas RIS1, RIS2, RIS3 and RIS4. RIS module 106 can include signaling module 106A, beam scanning module 106B and synchronization module 106C.

During operation, UAV 102 travels along a trajectory (e.g., planned route in free space) with the goal of landing safely at landing area 108A. The navigation of UAV 102 along the trajectory can be supported by the utilization of one or more of GPS positioning signals from GPS satellites 110, cellular positioning signals from cellular tower antennas (not shown) and IMU positioning signals from IMU sensors (not shown) internal to UAV 102. The collected positioning signals can be fused together by fusion module 104E to determine the position of the UAV 102 which is then used by control/planning module 104F and synchronization module 104G to control the actuators (e.g., propellers) of UAV 102 to control speed and attitude of UAV 102 with the goal of maintaining UAV 102 traveling safely and efficiently along the trajectory.

Once UAV 102 is far enough along the trajectory, UAV 102 eventually begins to receive RIS positioning signals from the RIS antennas in landing area 108A. These RIS signals may be actively transmitted from the RIS antennas or passively reflected by the RIS antennas. For example, RIS module 106 can utilize one or more of signaling module 106A, beam scanning module 106B and synchronization module 106C to control the RIS antennas to either directionally reflect RIS signals transmitted from RIS module 104B of UAV 102 back to RIS module 104B of UAV 102, or to directionally transmit generated RIS signals to RIS module 104C. In other words, the RIS antennas can transmit RIS signals and/or reflect RIS signals to UAV 102. The direction in which the RIS antennas reflect/transmit RIS signals from the RIS antennas to RIS module 104B of UAV 102 may be based on the position of UAV 102 determined by RIS module 106 based on the received RIS signals or based on GPS position information received from UAV 102. In either case, UAV 102 utilizes the RIS signals reflected/transmitted from the landing area RIS antennas to determine a more precise location of the landing area 108A via techniques such as trilateration.

Figure 2:
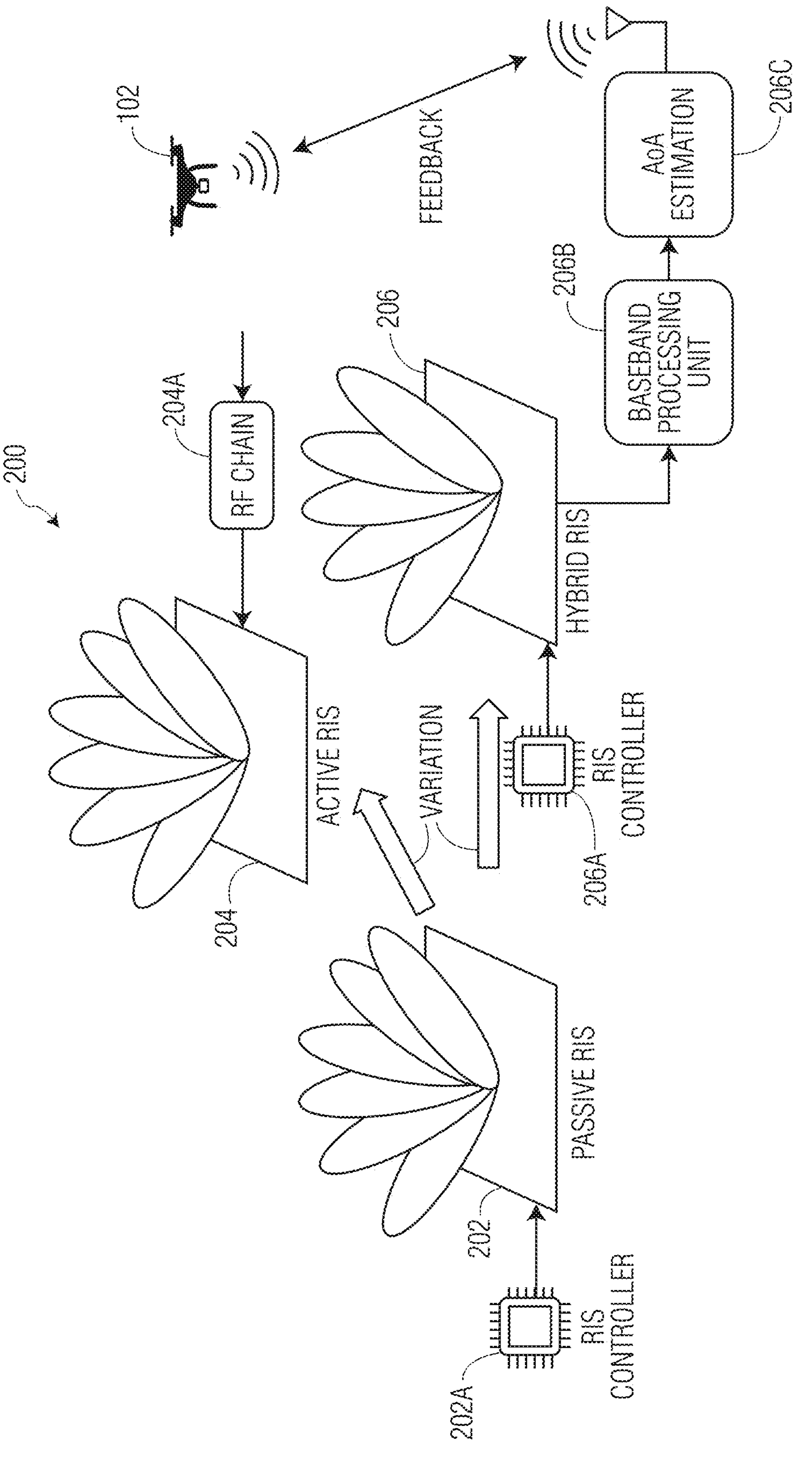
FIG. 2 shows a block diagram of different configurations of reconfigurable intelligent surface (RIS) systems, according to an example embodiment of the present disclosure.

As mentioned above, RIS antennas RIS1-RIS4 positioned in landing area 108A may operate in various modes. FIG. 2 shows a block diagram 200 of different types of RIS systems operating in different modes (e.g., passive RIS mode, active RIS mode and hybrid RIS mode). Although not shown, it is noted that RIS antennas are generally a panel constructed of a matrix of RIS elements that can be controlled to change their corresponding amplitude and phase for determining a direction in which the RIS antenna reflects and/or transmits RF waves. In a passive RIS system, RIS controller 202A controls the impedance of RIS antenna 202 to reflect incident RIS signals in a desired direction (i.e., a direction towards UAV 102). In an active RIS system, RIS controller 202A not only controls the impedance of RIS antenna 204 to direct the signals, but also actively transmits, via RF chain 204A, a RIS signal from RIS antenna 204 in the desired direction dictated by the impedance (i.e., the received RIS signal from UAV 102 wakes up the system and triggers transmission of a more powerful RIS signal from RIS antenna 204). In a hybrid RIS system, RIS controller 206A is able to both reflect RIS signals and receive new RIS signals via RIS antenna 206, baseband processing unit 206B and angle of arrival (AOA) estimation unit 206C.

In either case, the AOA of the RIS signals between UAV 102 and RIS antennas RIS1-RIS4 can be computed. The AOA of the RIS signals, the known positions of the UAV 102 and landing area 108A, and possibly round-trip times of the RIS signals are then used to determine angle of approach of UAV 102 to landing area 108A via trilateration techniques. This angle of approach is then used to control UAV 102 to adjust trajectory as needed to ensure a safe and accurate landing in landing area 108A.

Figure 3:
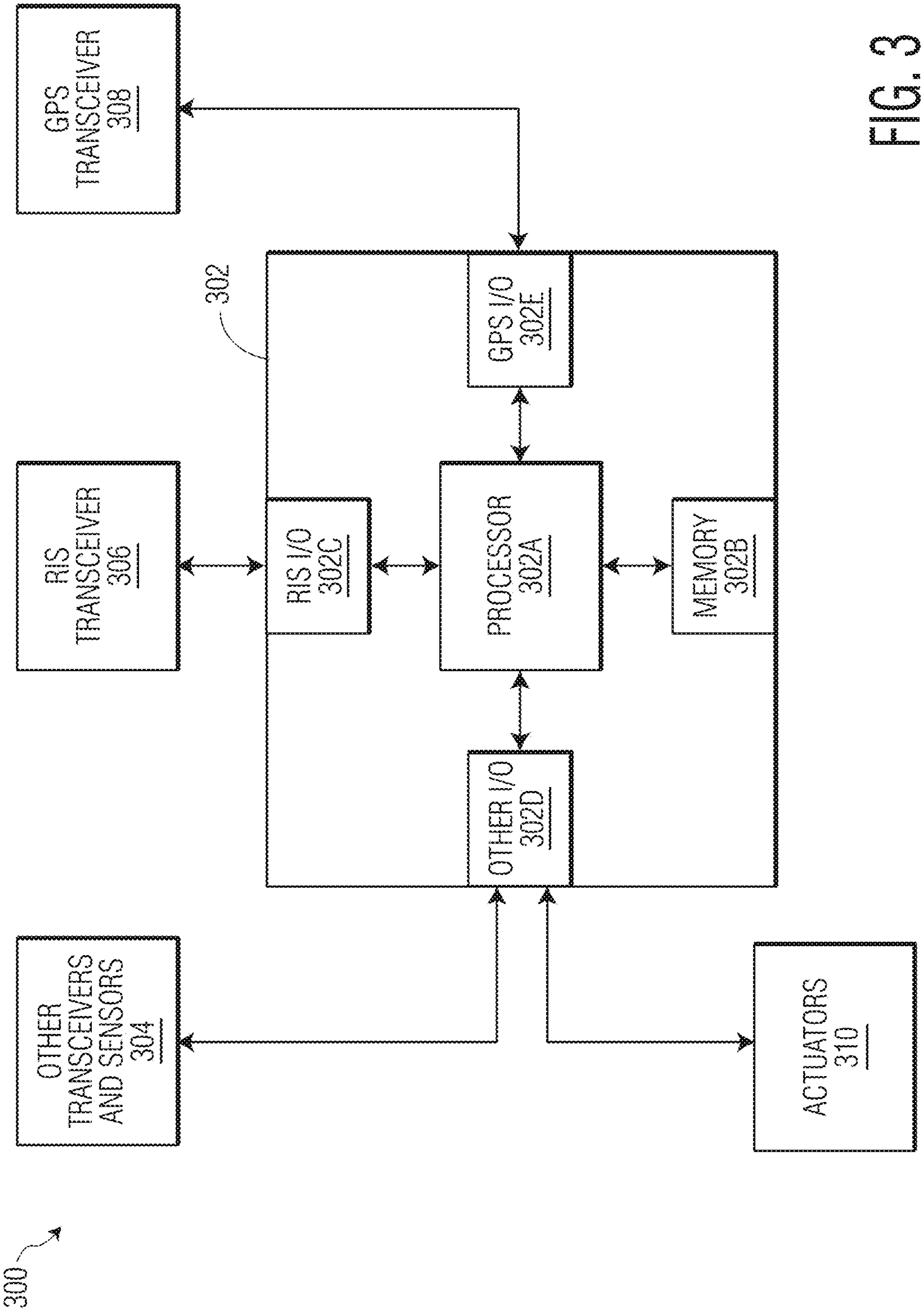
FIG. 3 shows a block diagram of hardware of the UAV system, according to an example embodiment of the present disclosure.

The hardware utilized by UAV controller 104 may include hardware components as shown in the block diagram 300 of FIG. 3. Specifically, UAV controller 104 may include controller 302 including processor 302A, memory 302B, RIS input/output (I/O) 302C, other device I/O 302D and GPS I/O 302E. The I/Os may include electrical connections and circuitry to successfully interface processor 302A to the various transceivers, sensors and actuators of UAV 102. Controller 302 may be interfaced with RIS transceiver 306, GPS transceiver 308, other transceivers and sensors 304 (e.g., cellular, IMU, etc.) and actuators 310 (e.g., propellers, etc.). During operation, processor 302A executes software stored in memory device 302B to control RIS transceiver 306, GPS transceiver 308, and other transceivers and sensors 304 to determine position and navigation of UAV 102, and then control actuators 310 to adjust dynamic behavior (e.g., speed and attitude) of UAV 102 to ensure that UAV 102 travels along the desired trajectory and accurately and safely reaches the desired destination.

Figure 4:
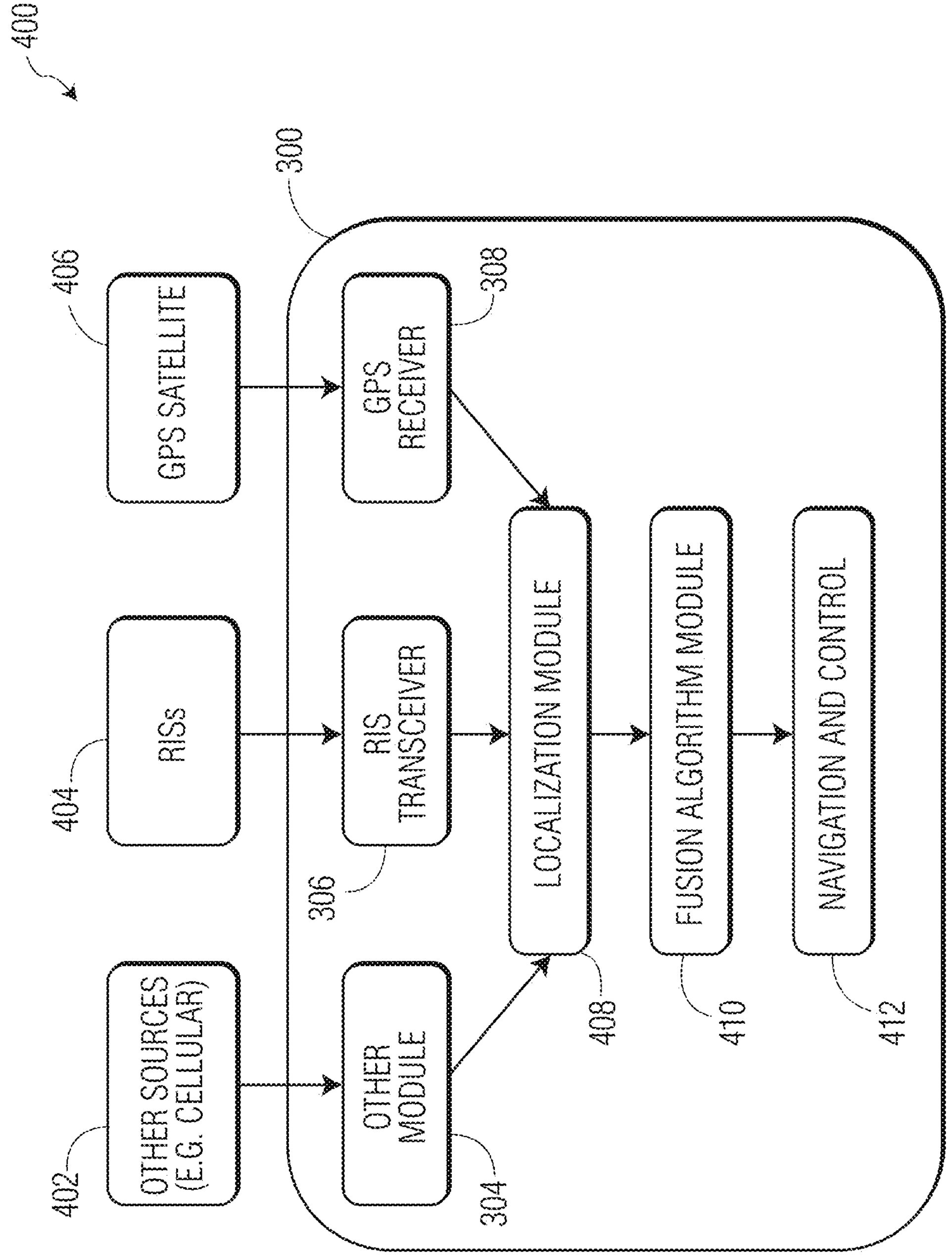
FIG. 4 shows a block diagram of the UAV system operation, according to an example embodiment of the present disclosure.

As mentioned above, UAV controller 302 can perform various steps to determine UAV position and accurately control the UAV based on the determined position. FIG. 4 shows a block diagram 400 of the UAV system operation. In one example, controller 302 receives various signals including cellular signals 402, RIS signals 404 and GPS signals 406. These signals are received by appropriate modules such as transceiver/sensor module 304, RIS transceiver module 306 and GPS transceiver module 308. The received signals are then input to localization module 408 which determines location of UAV 102 based on the individual signals (e.g., location based on cellular, location based on RIS and location based on GPS). These locations are then input to fusion algorithm module 410 which fuses (e.g., computes a weighted summation) the locations to produce a fused accurate location of UAV 102 which is then used by navigation and control module 412. The fused accurate location of the UAV 102 may be a point in 3D space or may be a volume (e.g., sphere) in 3D space where the UAV 102 is estimated to be located.

Figure 5:
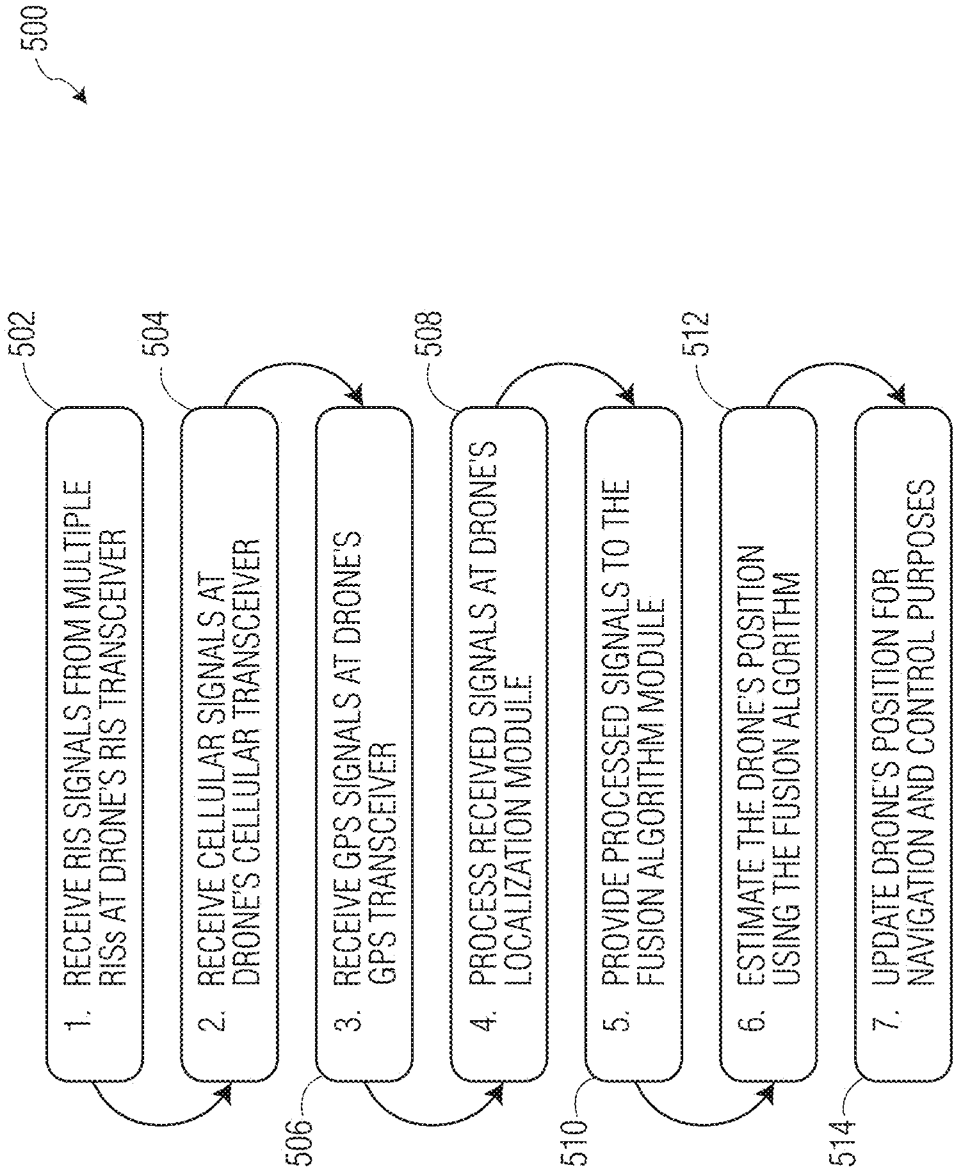
FIG. 5 shows a flowchart of the UAV system operation, according to an example embodiment of the present disclosure.

The overall operational flow of the modules shown in FIG. 4 is shown in the flowchart 500 of FIG. 5. In step 502, UAV 102 receives RIS signals from multiple RIS antennas (e.g., from RIS1-RIS4). In step 504 and 506, UAV 102 receives cellular signals and GPS signals respectively. The cellular signals may be received by cellular antennas positioned in proximity to the trajectory of UAV 102. In step 508, UAV 102 processes the various signals to determine independent locations based on each of the different types of signals (e.g., position based on GPS signals from GPS module 104A, position based on RIS signals from RIS module 104B, position based on cellular signals from cellular module 104C and possibly position based on IMU signals from IMU sensors and IMU module 104D). In step 510, UAV 102 provides the locations to the fusion algorithm module 104E which then combines the locations in a manner to estimate the drone's position in step 512. The fusion algorithm (which is described in more detail with reference to later figures) may include an algorithm such as an extended Kalman filter that produces a weighted summation of the locations to produce a single accurate location. In step 514, the drone's computed fused position is then used for navigation and trajectory control purposes. For example, the fused GPS, cellular and IMU location may be used to navigate along the trajectory until the RIS signals from the RIS antennas at the destination are received by UAV 102. Once the RIS signals are received, UAV 102 computes the fused location based on GPS, cellular, IMU and RIS signals. The RIS signals may be given more weight in such a scenario, especially as the drone approaches the destination for a landing maneuver.

Figure 6:
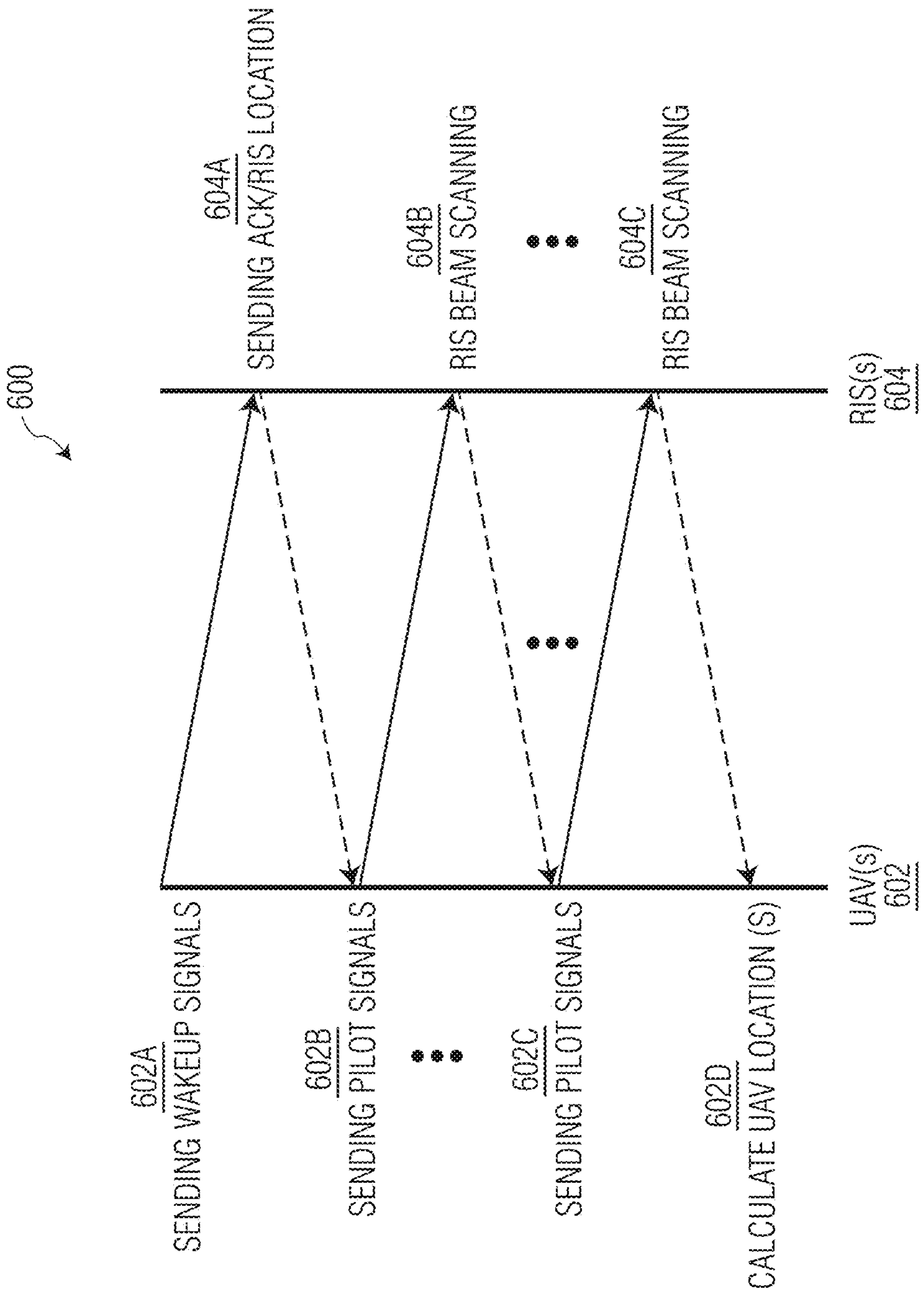
FIG. 6 shows a communication diagram of the UAV system operation, according to an example embodiment of the present disclosure.

FIG. 6 shows a communication diagram 600 of RIS signaling operation of the UAV system. As mentioned above, as UAV 102 approaches landing area 108A, UAV 102 begins transmitting RIS signals towards RIS antennas RIS1-RIS4 which may be operating in a sleep mode. Upon receiving the RIS signals, RIS antennas RIS1-RIS4 may respond by either reflecting the RIS signals or transmitting new RIS signals back to UAV 102 to begin the RIS positioning algorithm. The communication of RIS signals between UAV 102 and RIS antennas RIS1-RIS4 includes various steps. These steps are shown, for example, as UAV steps 602 and RIS antenna steps 604 in FIG. 6. For example, as UAV 102 travels along its trajectory, UAV 102 periodically transmits wake-up signals 602A. If one or more of the RIS antennas RIS1-RIS4 receive a wake-up signal, then RIS module 106 responds by sending an acknowledgement and RIS location data 604A back to UAV 102. The RIS location data may be the location of RIS antennas RIS1-RIS4 in free space. UAV 102 then periodically sends pilot signals 602B and 602C and RIS module 106 controls RIS antennas RIS1-RIS4 to perform beam scanning in steps 604B and 604C to receive and appropriately reflect the pilot signals back towards UAV 102. The UAV also computes the UAV location at step 602D. In other words, RIS antennas RIS1-RIS4 adjust the reflection/transmission angle of the RIS signals to form a beam that targets UAV 102 as it travels towards the destination. As this occurs, UAV 102, using AOA techniques such as trilateration on the received RIS signals, is then able to compute the location of UAV 102 relative to the destination. For example, UAV 102 may measure the distance from UAV 102 to each of the RIS antennas RIS1-RIS4 which may serve as radii of circles centered at each of the RIS antennas. The point of intersection of these circles can indicate the location of UAV 102 relative to the landing destination. The computed RIS location of UAV 102 is then input to the fusion algorithm along with the locations determined by the other sources cellular, GPS, IMU, etc. The combination of these locations with the newly determined RIS location offers a more accurate determination of the location of UAV 102.

Figure 7:
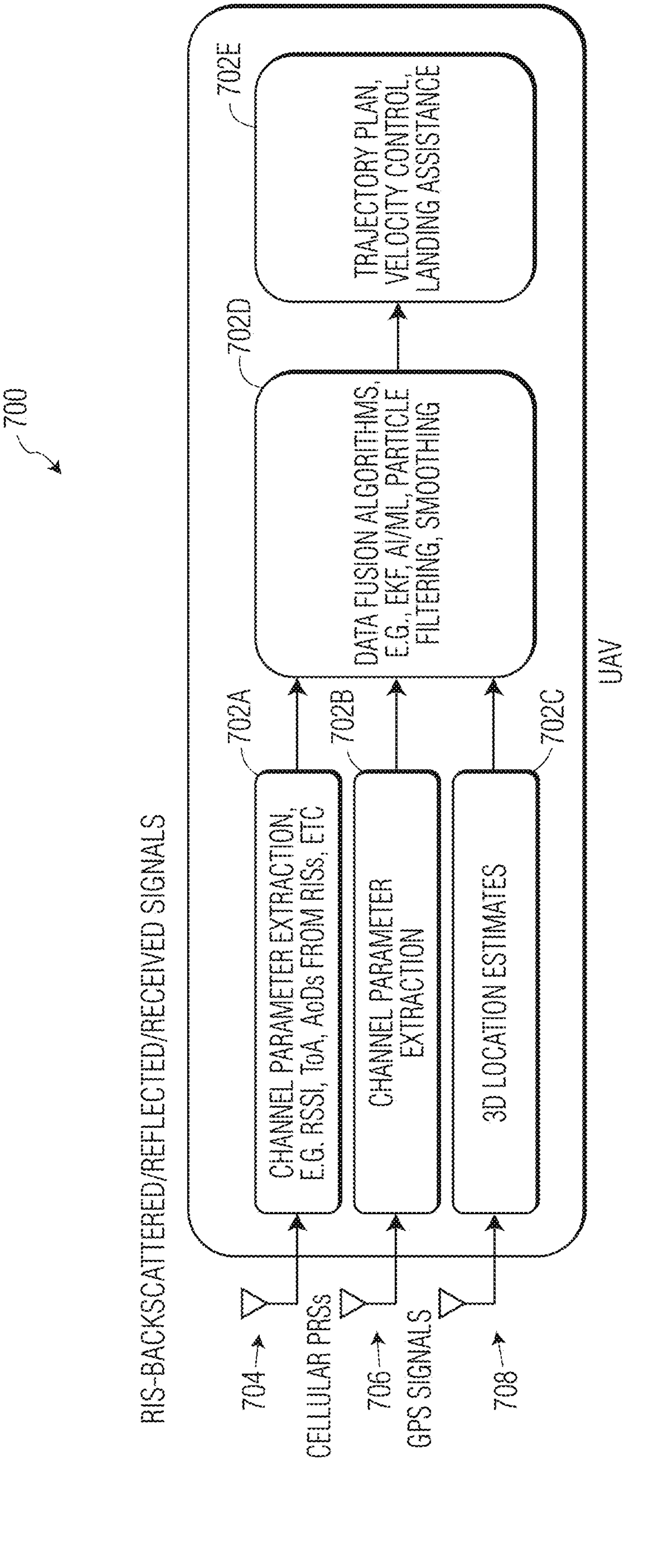
FIG. 7 shows a block diagram of the UAV system functionality, according to an example embodiment of the present disclosure.

FIG. 7 shows a block diagram 700 of the UAV system functionality. The GPS signals received from antenna 708 provide initial estimates for the 3D location estimates 702C of the UAV, whereas the RIS backscattered signals as well as cellular pilot signals received from antennas 704 and 706 respectively offer various channel parameters (e.g., received signal strength indicator (RSSI), time of arrival (ToA), angle of departure (AoD)) via modules 702A and 702B from the channels between the RIS antennas and the UAV. These parameters together with the initial position estimates of the UAV may be jointly considered for the fusing algorithms 702D, which is implemented in extended Kalman filter (EKF), artificial intelligence (AI) machine learning (ML), particle filtering, smoothing algorithms and the like. Based on the landing location and the outputs of the fusion algorithms, the UAV can perform trajectory planning 702E, velocity control, etc., for a safe navigation and landing of UAV 102. In operation, the weight of the RIS signals may increase as UAV 102 approaches the RIS antennas of the landing destination. This is primarily due to the RIS location being more accurate than the GPS and cellular locations, especially in urban environments.

In one example, an extended Kalman filter (EKF) may serve as the fusion algorithm. EKF is an efficient estimation technique used in various applications such as robotics, navigation systems, and computer vision, extending the classic Kalman filter for non-linear systems through linearization. EKF is known for its ability to optimally estimate the state of a system given noisy observations and imperfect control inputs, while also accounting for process uncertainties. It is noted, however, that other fusion algorithms may be employed. The preliminary equations involved in the EKF algorithm, particularly for a system with a state vector containing position, velocity, and orientation, along with an input vector describing linear accelerations and angular velocities.

In general, an EKF is an extension of the well-known Kalman filter. The EKF provides a mechanism for estimating a state of a system (e.g., location of the UAV) based on noisy measurements taken over time. The EKF generally predicts/updates the state of the system with each measurement. The basic steps of the EKF solution include prediction and update steps. In the prediction step, the EKF predicts the future state of the system based on the EKF model and the measurements. The EKF also predicts the covariance of the state to determine a measure of how the state is changing based on the measurements. In the update step the EKF predicts the measurement, computes innovation as the difference between the actual and predicted measurement, updates the Kalman gain, updates the state prediction based on the innovation and Kalman gain, and then updates the covariance. This basic flow is repeated as new measurements are received.

More specifically, the EKF solution includes preliminary functions, a prediction stage and an updated stage as described below. It is noted that although the solution below is based on GPS observations, the solution below may also be tailored to the use of other positioning signals such as terrestrial positioning signals like cellular and WiFi. Furthermore, the solution can also be adapted to integrate data from inertial navigation systems and other sensor inputs like barometers altimeters, odometers, or digital compasses.

Preliminary Functions

GPS Observation Function $$z_k = h(x_k, v_k) + n_k, \tag{1}$$

where $z_k$ is the actual GPS measurements at time k, h(•) is the nonlinear function relating the state $x_k$ and the GPS bias $v_k$ to the measurements. The observation noise $n_k$ accounts for uncertainties in GPS measurements.

RIS-Based Observation Function $$\bar{z}_k = g(x_k \mid RSS_k, ToA_k, TDoA_k) + n_k, \tag{2}$$

where $\bar{z}_k$ is the actual RIS-based measurements at time k, g(•) is the nonlinear function relating the state $x_k$ and RSS, ToA, and TDoA data to the measurement. The observation noise $n_k$ accounts for uncertainties in RIS measurements.

1. Prediction Stage 1.1 State Prediction $$\hat{x}_{k|k-1} = f(\hat{x}_{k-1|k-1}, u_{k-1}), \tag{3}$$

where $\hat{x}_{k|k-1}$ is the predicted state at time k based on the previous state estimation $\hat{x}_{k-1|k-1}$ and control inputs $u_{k-1}$. The function $f(\bullet)$ represents the system dynamics.

1.2 Error Covariance Prediction $$P_{k|k-1} = F_{k-1} * P_{k-1|k-1} * (F_{k-1})^T + Q_{k-1} \tag{4}$$

where $P_{k|k-1}$ is the error covariance matrix at time k based on the previous error covariance matrix $P_{k-1|k-1}$ and the system's dynamics. The matrix $F_{k-1}$ is the state transition matrix, $(\bullet)^T$ is the transpose operation, and $Q_{k-1}$ is the process noise covariance matrix.

2. Update Stage 2.1 Kalman Gain Calculation $$K_k = P_{k|k-1} * (H_k)^T * (H_k * P_{k|k-1} * (H_k)^T + R_k)^{-1}, \tag{5}$$

where $K_k$ is the Kalman gain matrix at time k based on the predicted error covariance matrix $P_{k|k-1}$, the observation matrix $H_k$, and the observation noise covariance matrix $R_k$.

2.2 State Update $$x_{k|k} = x_{k|k-1} + K_k * (z_{k(new)} - h(x_{k|k-1}, 0)), \tag{6}$$

where $\hat{x}_{k|k}$ is the updated state estimate at time k based on the predicted state estimate $\hat{x}_{k|k-1}$ and the new observation $z_{k(new)}$. The updated state considers the difference between the actual GPS measurement and the predicted GPS measurement, weighted by the Kalman gain.

2.3 Error Covariance Update $$P_{k|k} = (I - K_k * H_k) * P_{k|k-1}, \tag{7}$$

where $P_{k|k}$ is the updated error covariance matrix at time k based on the predicted error covariance matrix $P_{k|k-1}$, the Kalman gain matrix $K_k$, and the observation matrix $H_k$.

2.4 Weighted Sum after State Update $$\hat{x}_k = \alpha[\hat{x}_k \mid z_{k(new)}] + \beta x_k|\bar{z}_{k(new)}], \tag{8}$$

where $\hat{x}_k$ is the final state estimate as a weighted sum of the state estimates updated with the GPS observation and the RIS observation, a and B are the respective weights. The weights account for different accuracies of the two measurement sources.

These above equations emphasize the importance of the data fusion approach in predicting and updating the state of the system over time as shown in Equations (9) and (10) below:

$$x_k = \begin{bmatrix} x_k \\ y_k \\ z_k \\ v_{x_k} \\ v_{y_k} \\ v_{z_k} \\ \text{roll}_k \\ \text{pitch}_k \\ \text{yaw}_k \end{bmatrix} \quad u_{k-1} = \begin{bmatrix} a_{x_{k-1}} \\ a_{y_{k-1}} \\ a_{z_{k-1}} \\ \omega_{roll_{k-1}} \\ \omega_{pitch_{k-1}} \\ \omega_{yaw_{k-1}} \end{bmatrix} \tag{9}$$

$$\text{State transition function: } f(x_{k-1}, u_{k-1}) = x_{k-1} + F_u * u_{k-1} * \Delta t \tag{10}$$

where:

- $x_k$ is the state vector at time step k which contains the position ($x_k$, $y_k$, $z_k$), velocity ($v_{x_k}$, $v_{y_k}$, $v_{z_k}$), and orientation ($\text{roll}_k$, $\text{pitch}_k$, $\text{yaw}_k$) of the system being modelled;
- $u_{k-1}$ is the input vector at time step k−1, which contains the linear acceleration ($a_{x_{k-1}}$, $a_{y_{k-1}}$, $a_{z_{k-1}}$) and angular velocities ($\omega_{roll_{k-1}}$, $\omega_{pitch_{k-1}}$, $\omega_{yaw_{k-1}}$) of the system at the previous time step.
- The state transition function is the equation that updates the state vector $x_{k-1}$ to the current state vector $x_k$ using the input vector $u_{k-1}$ and the time difference ($\Delta t$) between time steps.
- The function $f(\cdot)$ relates the previous state, input, and time difference to predict the new state of the system.
- The term $F_u * u_{k-1} * \Delta t$ represents the impact of the input vector on the state vector.

Figure 8:
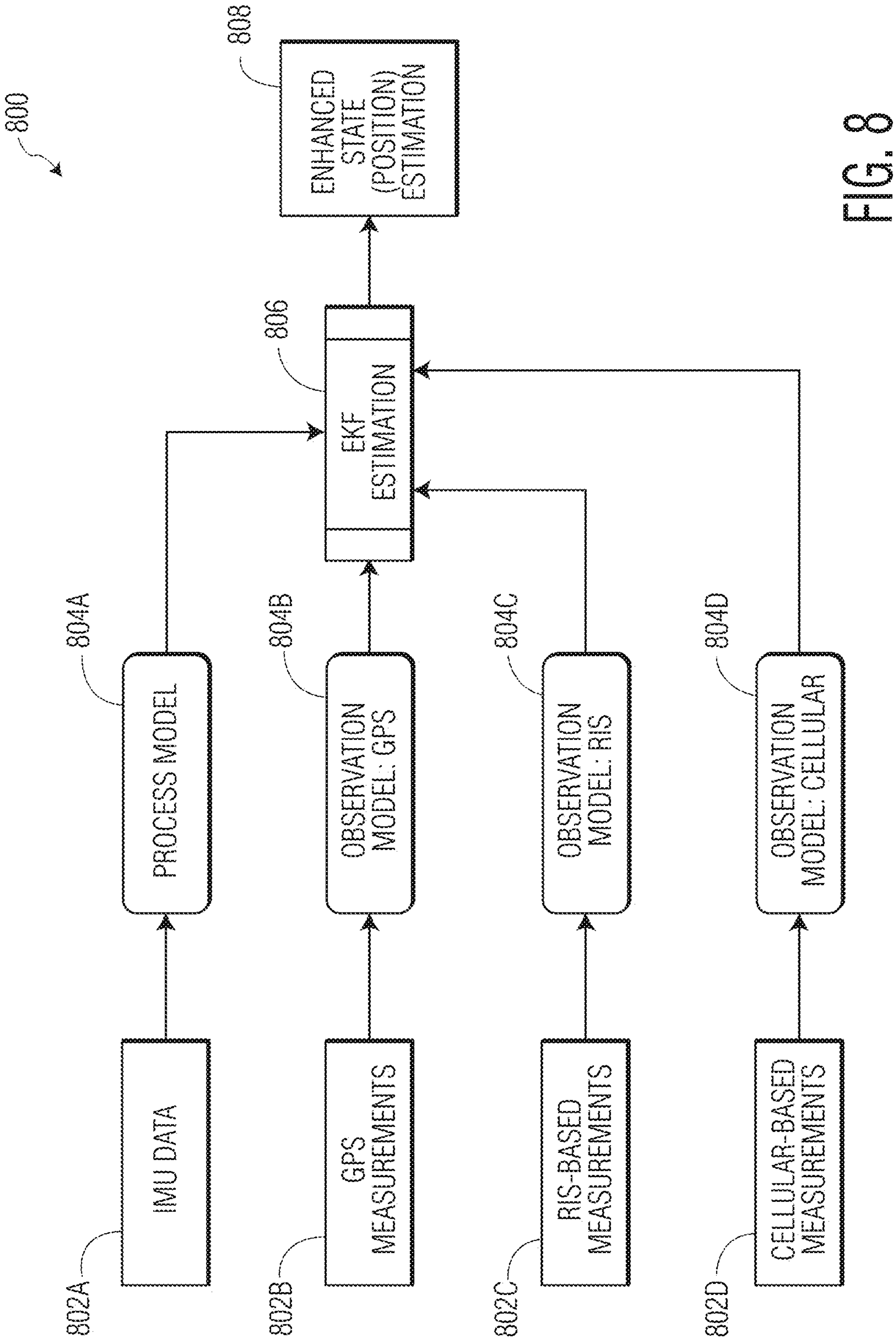
FIG. 8 shows a block diagram of the Extended Kalman filter solution, according to an example embodiment of the present disclosure.

FIG. 8 shows a block diagram 800 of the overall Extended Kalman filter solution. For example, in steps 802A, 802B, 802C and 802D, the UAV controller inputs IMU position data, GPS position measurements, RIS position measurements and cellular position measurements to various models including process model 804A, GPS observation model 804B, RIS observation model 804C and cellular observation model 804D which model the position of UAV 102 based on the respective measurements. In other words, each model produces an estimated location of the UAV 102 based on independent positioning methods (e.g., IMU dead reckoning, GPS, RIS and Cellular positioning). The estimated location outputs of the observation models are then input to EKF estimation module 806 which predicts the state of the UAV position in module 808 based on previous states estimates as shown in equation (3), computes error covariance based on previous error covariance and UAV system dynamics as shown in equation (4), computes Kalman gain based on the predicted covariance, observation matrix and observation noise covariance matrix as shown in equation (5), updates the state estimate based on the predicted state estimate and new observation as shown in equation (6), computes error covariance based on the predicted error covariance, Kalman gain and observation matrix as shown in equation (7), and computes a weighted sum of the UAV position as shown in equation (8). The updated position estimate of UAV 102 is then used to control UAV 102 and update navigation. In other words, the UAV controller uses the accurate location of UAV 102 and the known location of the destination to control the UAV propellers to alter speed, direction and altitude of UAV 102 to safely and accurately approach the landing area. This process is repeated periodically to ensure accurate position estimation of UAV 102 until the UAV safely lands at the destination.

It is noted that UAV 102 may be controlled based on various positioning signals in conjunction with the RIS positioning signals when available. This functionality allows UAV 102 to compute location based on one or more conventional positioning signals as it travels along its trajectory, and then refine the computed position according to RIS signals received at important areas along the trajectory. For example, RIS antenna systems may be placed in multiple locations in urban canyon environments to help refine the position estimate and guide UAV 102 along its trajectory. RIS antenna systems may also be placed at destinations (i.e., landing areas) as mentioned above to ensure that UAV 102 safely and accurately positioned itself and lands at a desired location. Thus, when traveling along a trajectory, UAV 102 may receive RIS signals from different RIS signals along the trajectory and utilize these RIS signals in conjunction with other location signals (e.g., GPS, cellular, IMS, etc.) to produce a fused location that is more accurate due to the RIS signals resistance to multipath and other negative effects. In other words, the directional nature of the RIS signals may capitalize on beam forming techniques to perform line of sight communication with UAV 102 thereby avoiding or at least reducing the possibly of multipathing. The EKF performed by UAV 102 may weight the contribution of the RIS signals based on various factors including signal strength and relative location between the RIS antennas and UAV 102. It is also possible that UAV 102 may simultaneously receive and utilize RIS signals from two or more separately located RIS systems. For example, a first RIS system may be located halfway along the UAV trajectory and a second RIS system may be located at the UAV destination. EKF solution of UAV 102 may compute a location based on the signals received from the first RIS system and a location based on the signals received from the second RIS system. Each of these locations may be weighted by the EKF solution as appropriate to produce a fused solution along with the GPS, cellular and IMS locations.

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A controller for controlling an autonomous vehicle, the controller comprising:

a reconfigurable intelligent surface (RIS) transceiver configured to receive RIS signals from a RIS device;

a positioning signal receiver configured to receive positioning signals from a positioning signal transmitter; and a processor configured to:

process the RIS signals to produce RIS data, process the positioning signals to produce positioning data, fuse the RIS data and the positioning data using a data fusion algorithm comprising weights to compute a location of the autonomous vehicle, wherein the weights of the RIS data and the positioning data are adjusted based on relative location of the autonomous vehicle to the RIS device, and control operation of the autonomous vehicle based on the computed location.

2. The controller of claim 1, wherein the RIS transceiver is further configured to receive additional RIS signals from at least one additional RIS device, and wherein the processor is further configured to compute the location of the autonomous vehicle relative to a reference location associated with the RIS device and the at least one additional RIS device based on the RIS signals and the additional RIS signals.

3. The controller of claim 1, wherein the RIS transceiver is further configured to transmit a wake-up signal to the RIS device thereby triggering the RIS device to transmit the RIS signals to the RIS transceiver.

4. The controller of claim 1, wherein the processor is further configured to control operation of the autonomous vehicle by controlling at least one of speed, direction, acceleration, or attitude of the autonomous vehicle to navigate the autonomous vehicle to a destination relative to the RIS device.

5. The controller of claim 1, wherein the received RIS signals are passive signals transmitted from the RIS transceiver and reflected from the RIS device, or the received RIS signals are active signals transmitted from the RIS device in response to a wake-up signal transmitted from the autonomous vehicle to the RIS device.

6. The controller of claim 1, wherein the processor is further configured to compute the relative location of the autonomous vehicle to the RIS device by trilateration based on the received RIS signals.

7. The controller of claim 1, wherein the positioning signal receiver is further configured to receive the positioning signals as at least one of a global positioning system (GPS) signals or cellular signals.

8. The controller of claim 1, wherein the processor is further configured to compute the location of the autonomous vehicle by computing an initial position based on the positioning signals and adjusting the initial position based on channel parameters computed from the RIS signals.

9. The controller of claim 1, wherein the processor is further configured to fuse the RIS data and the positioning data using the fusion algorithm comprising an extended Kalman filter that adjusts the weights of the RIS data and the positioning data to compute the location of the autonomous vehicle.

10. The controller of claim 1, wherein the processor is further configured to adjust the weights of the RIS data and the positioning data for computing the location of the autonomous vehicle based on channel parameters computed from the RIS signals.

11. A method for controlling an autonomous vehicle, the method comprising:

receiving, by a reconfigurable intelligent surface (RIS) transceiver of the autonomous vehicle, RIS signals from a RIS device;

receiving, by a positioning signal receiver of the autonomous vehicle, positioning signals from a positioning signal transmitter;

processing, by a processor of the autonomous vehicle, the RIS signals to produce RIS data;

processing, by the processor of the autonomous vehicle, the positioning signals to produce positioning data;

fusing, by the processor of the autonomous vehicle, the RIS data and the positioning data using a data fusion algorithm comprising weights to compute a location of the autonomous vehicle, wherein the weights of the RIS data and the positioning data are adjusted based on relative location of the autonomous vehicle to the RIS device; and controlling, by the processor of the autonomous vehicle, operation of the autonomous vehicle based on the computed location.

12. The method of claim 11, further comprising:

receiving, by the RIS transceiver, additional RIS signals from at least one additional RIS device; and computing, by the processor, the location of the autonomous vehicle relative to a reference location associated with the RIS device and the at least one additional RIS device based on the RIS signals and the additional RIS signals.

13. The method of claim 11, further comprising:

transmitting, by the RIS transceiver, a wake-up signal to the RIS device thereby triggering the RIS device to transmit the RIS signals to the RIS transceiver.

14. The method of claim 11, further comprising:

controlling, by the processor operation of the autonomous vehicle by controlling at least one of speed, direction, acceleration, or attitude of the autonomous vehicle to navigate the autonomous vehicle to a destination relative to the RIS device.

15. The method of claim 11, further comprising:

receiving, by the RIS transceiver, the received RIS signal as passive signals transmitted from the RIS transceiver and reflected from the RIS device, or receiving, by the RIS transceiver, the received RIS signals as active signals transmitted from the RIS device in response to a wake-up signal transmitted from the autonomous vehicle to the RIS device.

16. The method of claim 11, further comprising:

computing, by the processor, the relative location of the autonomous vehicle to the RIS device by trilateration based on the received RIS signals.

17. The method of claim 11, further comprising:

receiving, by the positioning signal receiver, the positioning signals as at least one of global positioning system (GPS) signals or cellular signals.

18. The method of claim 11, further comprising:

computing, by the processor, the location of the autonomous vehicle by computing an initial position based on the positioning signals and adjusting the initial position based on channel parameters computed from the RIS signals.

19. The method of claim 11, further comprising:

fusing, by the processor, the RIS data and the positioning data using the fusion algorithm comprising an extended Kalman filter that adjusts the weights of the RIS data and the positioning data to compute the location of the autonomous vehicle.

20. The method of claim 11, further comprising:

adjusting, by the processor, the weights of the RIS data and the positioning data for computing the location of the autonomous vehicle based on channel parameters computed from the RIS signals.

* * * * *